(12) United States Patent
Seidel

(10) Patent No.: US 8,443,493 B2
(45) Date of Patent: May 21, 2013

(54) FASTENING DEVICE

(75) Inventor: Stefan Seidel, Gelchsheim (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 790 days.

(21) Appl. No.: 12/418,695

(22) Filed: Apr. 6, 2009

(65) Prior Publication Data

US 2009/0249923 A1 Oct. 8, 2009

(30) Foreign Application Priority Data

Apr. 5, 2008 (DE) .................. 10 2008 017 451

(51) Int. Cl.
*F16B 13/04* (2006.01)

(52) U.S. Cl.
USPC ............... 24/297; 24/290; 24/291; 411/508; 411/509; 411/510

(58) Field of Classification Search
USPC ................... 24/290, 291, 297; 411/508, 509, 411/510
See application file for complete search history.

(56) References Cited

U.S. PATENT DOCUMENTS

| | | | | |
|---|---|---|---|---|
| 3,372,960 A * | 3/1968 | Fisher | ............................ | 384/439 |
| 3,449,799 A * | 6/1969 | Bien | ............................ | 411/548 |
| 3,478,395 A * | 11/1969 | Flora | ............................ | 24/290 |
| 3,740,083 A * | 6/1973 | Zenhausern | ................. | 403/243 |
| 4,568,215 A * | 2/1986 | Nelson | ............................ | 403/13 |
| 4,624,585 A * | 11/1986 | Nix et al. | ...................... | 384/296 |
| 4,762,437 A * | 8/1988 | Mitomi | ........................... | 403/11 |
| 4,952,106 A * | 8/1990 | Kubogochi et al. | ............. | 411/48 |
| 5,011,355 A * | 4/1991 | Motoshige | ..................... | 411/552 |
| 5,400,461 A * | 3/1995 | Malish et al. | .............. | 15/230.17 |
| 6,088,878 A * | 7/2000 | Antonucci et al. | ............ | 16/86 A |
| 6,119,306 A * | 9/2000 | Antonucci et al. | ............ | 16/86 A |
| 6,799,931 B2 * | 10/2004 | Kwilosz | ......................... | 411/510 |
| 7,178,206 B2 * | 2/2007 | Kuhnle et al. | ................... | 24/297 |
| 7,356,879 B2 * | 4/2008 | Dembowsky et al. | ............ | 16/82 |
| 7,736,107 B2 * | 6/2010 | Okada | ............................ | 411/41 |

FOREIGN PATENT DOCUMENTS

DE 1575071 11/1969
GB 1142763 A 2/1969

* cited by examiner

*Primary Examiner* — Robert J Sandy
*Assistant Examiner* — David Upchurch
(74) *Attorney, Agent, or Firm* — Lowe Hauptman Ham & Berner, LLP

(57) ABSTRACT

A fastening device for attaching a structural member to a support member includes a lower portion having a shank portion attachable to the support member, and an upper portion having a radial flange at the outer side and an axial passage. The shank portion is insertable into the axial passage of the upper portion from one end thereof. At least one outer side of the shank portion has an axially parallel extending row of saw-tooth-shaped teeth, and a resilient pawl being formed at the axial passage for cooperating with the row of teeth in a ratchet manner, when the upper portion is pushed onto the shank portion in a first direction, to block a displacement of the upper and lower portions in a second, opposite direction.

18 Claims, 2 Drawing Sheets

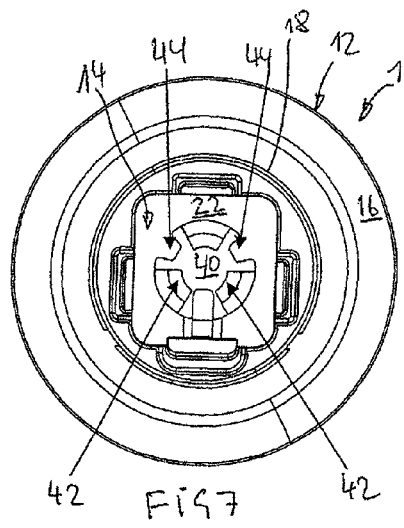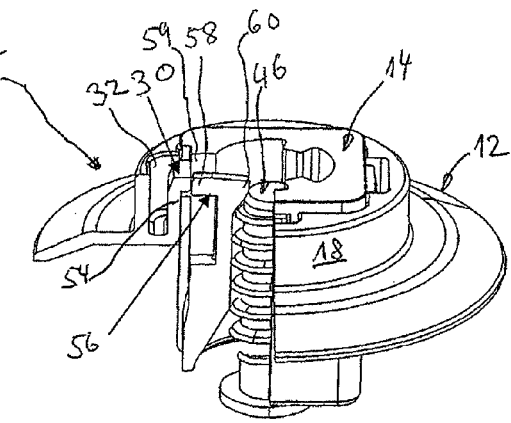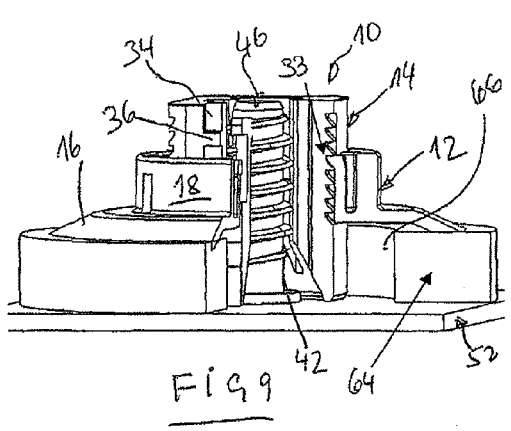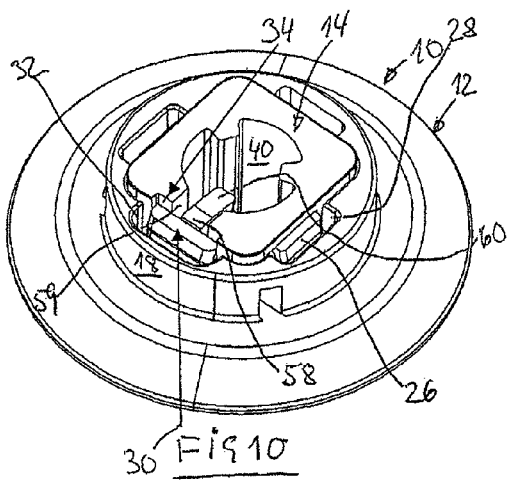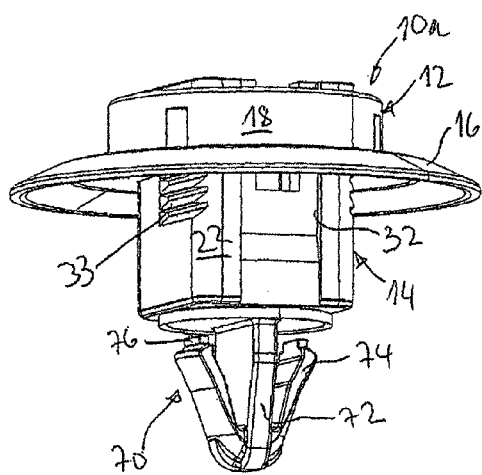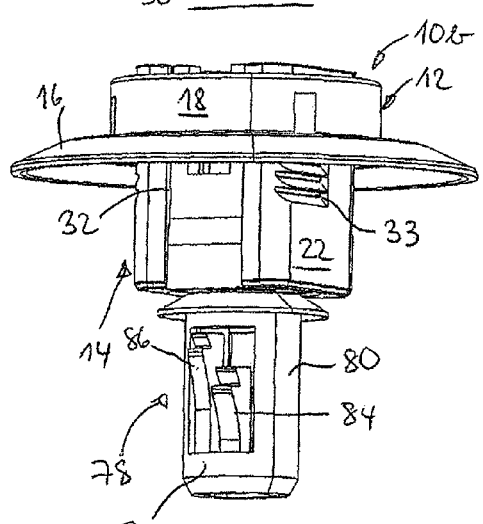

FASTENING DEVICE

RELATED APPLICATIONS

The present application is based on, and claims priority from, German Application Number 10 2008 017 451.3, filed Apr. 5, 2008, the disclosure of which is hereby incorporated by reference herein in its entirety.

The present invention is related to a fastening device for the attachment of a structural member to a support member according to the patent claim 1.

In the automotive industry in particular, a variety of fastening elements is used for the attachment of structural members of a car body. The structural members have frequently different thicknesses, and conventional devices for the attachment can often not compensate for large tolerances. For this reason, different devices are often used for the same fastening function.

The present invention is based on the objective to provide a device for the attachment of a structural member to a support member which permits a large tolerance compensation.

This objective is resolved by the features of the patent claim 1.

In the device according to the present invention, two elements are provided, namely, an upper and a lower portion, which are made of plastic material and can be formed in an integral injection moulding process. The lower portion has a shank portion of for example rectangular, preferably squariform perimeter. The lower portion is further provided with means for the attachment to a support member. The upper portion has a radial flange as well as an axial passage, through which the shank portion of the lower portion can be inserted from one end thereof. At least one outer side of the shank portion has an axially parallel extending row of saw-tooth-shaped teeth, and a resilient pawl is formed on the passage such that the pawl and the row of teeth cooperate ratchet-like when the upper portion is pushed up to the shank portion. After pushing up, both portions can no more be displaced into opposite directions, because this is blocked by the pawl and the respective tooth behind which the pawl is engaging.

It is to be understood that upon integral moulding of the lower and the upper portion, the same can be separated from each other by relatively weak forces. Such a separation can take place in the injection tool already, the production cost being reduced by doing so. Before the utilisation, the upper portion can be pushed onto the lower portion for a certain distance, for instance until the pawl engages behind the first ratchet tooth of the row of teeth. The structural member which is to be fastened has also a hole and is laid on the support member. Subsequently, the lower portion is set on the support member through this hole, and the upper portion is pushed onto the lower portion for so long until the flange captures the structural member which is to be fastened on the facing side and clamps it in together with the support member. The support member may feature thicknesses varying within certain limits, wherein the tolerance which the device of the present invention permits depends on the length of the row of teeth.

The device of the present invention has several advantages. Besides to the large tolerance compensation, high retaining forces are achieved, whilst the forces for mounting are low. The production cost is also low. Mounting and dismounting are simple. The device of the present invention is suited for a large field of utilisations and can be reused after detachment from the support member. For this purpose, the upper portion must be pushed off from the shank portion in the direction of insertion. Subsequently, the upper portion can be set onto the shank portion anew. The dismounting of upper and lower portion is advantageous according to one embodiment of the present invention, when the lower portion is formed such that the upper portion can be removed through the other end of the shank portion.

Depending on the circumstances, one row of teeth at one side of the shank portion is sufficient for locking the upper and the lower portion. Preferably, a row of teeth is provided on at least two opposing sides of the shank portion.

According to one embodiment of the present invention, the pawl co-operating with the row of teeth can be formed at an end of a lever which is formed by an axially parallel recess of the upper portion.

Different constructional solutions are conceivable in order to connect the lower portion with the support member. According to one embodiment of the present invention, one of them is that the shank portion is connected to a fastening clip, the clip including a shank and locking arms formed on the free end of the shank, the locking arms extending obliquely towards the shank portion. Such fastening clips have become known in a great variety of forms of realisation. When the clip is being inserted, the locking arms engage with their free ends behind the edge of that hole into which the clip is being inserted. Through this, the clip is secured against being pulled out of the hole of the support member.

In another embodiment of the present invention, it is provided that the shank portion is connected to a fastening base which includes a frame-shaped or cylindrical shaft, two or more locking arms being formed at least on one side of a lower transverse web of the shaft, the locking arms extending obliquely towards the shank portion, and a locking portion thereof at the ends of the arms being located at different height. In this way of attachment, the frame-shaped shaft is inserted into the opening, similar like with the clip described above. Depending on the thickness of the support member, a locking arm arrives then into engagement with the support member.

Finally, according to a further embodiment of the present invention, the shank portion may have an axial passage, inner locking elements being associated to the passage, the inner locking elements cooperating ratchet-like with a thread on a stud bolt. Stud bolts are wide-spread in the attachment of structural members on the body of automobiles. Preferably, three circumferentially equidistant inner locking elements are provided, a guiding bridge being arranged between these inner locking elements which prevents a misalignment of the shank portion on the stud bolt. In such a form of realisation, the lower portion is solely formed by the shank portion.

In the context of the form of realisation described at last, one embodiment of the present invention provides that a resilient safety nose is formed in the passage of the upper portion near to the other end, the nose engaging axially a parallel outer recess of the shank portion when the upper portion is pushed onto the shank portion, a stop means in the recess limiting this movement, and that an axially parallel lever arm is formed through a recess in the wall of the shank portion facing the safety nose, the free end thereof cooperating at one side with the thread of the stud bolt, the other end being located opposite to the safety nose such that the safety nose is moved away from the stop means when the lever arm is radially outwardly deformed away from thread of the stud bolt.

Finally, one embodiment of the present invention provides that the safety nose cooperates with the abutment when the pawl engages behind a first tooth of the row of teeth.

The present invention will be explained in more detail by means of an example of its realisation in the following.

FIG. 7 shows the top view on the device of FIG. 3.

FIG. 8 shows a similar depiction like that of FIG. 6.

FIG. 9 shows the attachment of a structural member on a support member with the aid of the device of the preceding figures, in a perspective view which is partially cut open.

FIG. 10 shows a similar depiction like FIG. 3 or 5 of the device of the present invention in a magnified perspective view.

FIG. 11 shows the device of FIG. 1 or 2 in connection with a clip in a perspective view.

FIG. 12 shows the device of FIG. 1 or 2 in connection with a so-called cylindrical base in a perspective view.

Figure 1:
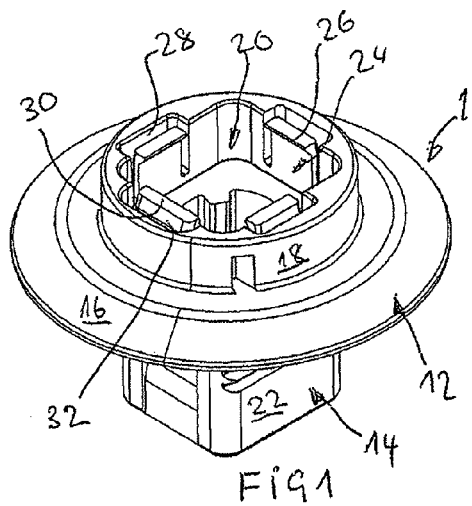
FIG. 1 shows a device according to the present invention from the topside in a perspective view.
Figure 2:
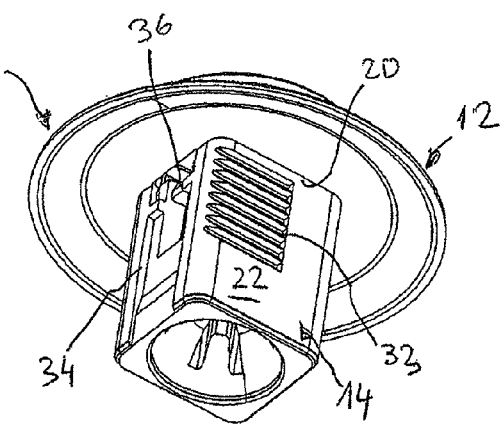
FIG. 2 shows the device of FIG. 1 from the bottom side in a perspective view.

The fastening device made of plastic material and depicted in FIG. 1 to 12 is generally designated with 10. It has an upper portion 12 and a lower portion 14. The upper portion 12 has a radial flange 16, which is formed on the lower end of a cylindrical portion 18. Further, the upper portion 12 has a passage 20. The lower portion 14 has a shank portion 22 quadriform in its circumference, which can be matingly received by the correspondingly formed passage 20, as is depicted in FIGS. 1 and 2. In FIGS. 1 and 2, upper and lower portion 12, 14 are in that position with respect to each other in which they are produced in the injection moulding. However, they can be subsequently separated from each other. The upper end in FIG. 1 of the shank portion 22 is sunk in the inside of the passage 20, and the upper end is connected to the upper portion near to the lower end of the passage 20. One recognises further in FIG. 1, that one locking element 24 is provided on each one of three sides of the passage 20, with a locking nose 26 on the free end. The locking elements 24 are formed by axially parallel recesses 28 of the upper portion. Thus, the locking elements 24 can be displaced radially with their locking noses 26. A safety nose 30 is provided on the fourth side of the passage 20, which is also formed by an axially parallel recess 28 in the upper portion. The safety nose will be dwelled on below.

One recognises in FIG. 2 that the outer side of the shank portion 22 laying on the topside features a row of teeth 33, which runs also axially parallel. Two further sides of the shank portion 22 have a similar row of teeth (not to be recognised). On the side of the shank portion 22 left from the row of teeth 33 in FIG. 2, a recess 34 is provided on the outer side of the shank portion 14, which has a stop means further up which will be dwelled on below. With its outer side, the stop means 36 lays on the height of the outer side of the wall of the shank portion 14 in which the recess 34 is formed.

As can be recognized in FIG. 7 in particular, the shank portion 14 has an axial passage which is a through hole 40.

Three inner locking elements 42 arranged at equal perimeter distances are formed in the passage near to the lower end of the shank portion 22, guiding bridges 44 being formed between the locking elements. With the aid of these measures, the shank portion 22 can be pushed up to a stud bolt 46, as this is shown in FIG. 5 to 9. The stud bolt 46 has a thread 48 and a head 50 which is welded up on a support member 52.

Figure 6:
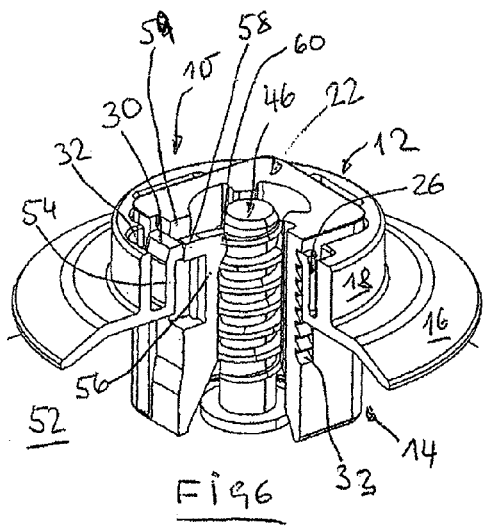
FIG. 6 shows the placement of the device of FIG. 3 on the stud bolt according to FIG. 5 in a perspective view which is partially cut open.

One recognises from FIGS. 6 and 7 that the safety nose 30 is formed on a lever arm 54, which is formed by the recess 32 running axially parallel to the upper and lower portions 12, 14, as was already mentioned. Opposite to the lever 54 there is a lever 56, which is formed in a break-through 59 in the associated wall of the shank portion 22. The free end of the lever 56 has a first projection portion 58, which is located opposite to the safety nose 30 in FIGS. 6 and 8. A facing projection 60 co-operates with the thread of the stud bolt 46.

Figure 3:
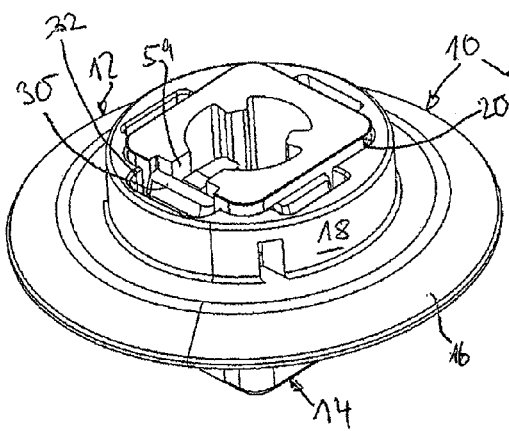
FIG. 3 shows the devices according to FIGS. 1 and 2 from the topside in a perspective view, in a condition being partially pushed together.
Figure 4:
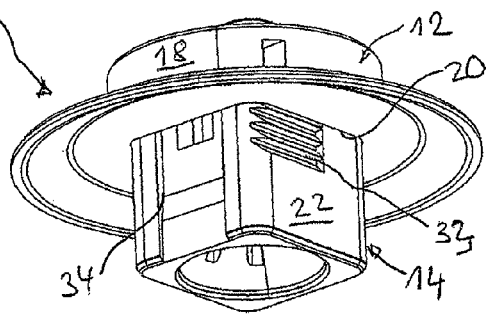
FIG. 4 shows the device of FIG. 3 from the bottom in a perspective view.

As already mentioned, FIGS. 1 and 2 show the fastening device in the formed condition. At first, the shank portion 22 is inserted into the passage 20, upper and lower portions 12, 14 being separated from each other in doing so. This is depicted in FIGS. 3 and 4. The locking elements 24 with their locking noses 26 engage behind the first tooth of the row of teeth 33. As can be deduced from FIGS. 6 and 9 in particular, the teeth of the row of teeth 33 have a sawtooth shape. After the locking nose 26 has engaged behind a tooth, any movement of the two parts in the opposite direction is no more possible. In the described pushing together, this is limited in that the safety nose 30 abuts against the stop means 36. In this relative position of the upper and the lower portion, the locking noses 26 of the locking elements 24 have engaged behind the first tooth of the rows of teeth 33. The device of the present invention can be transported in this condition. The portions can not be removed from each other, neither in the one nor in the other direction.

Figure 5:
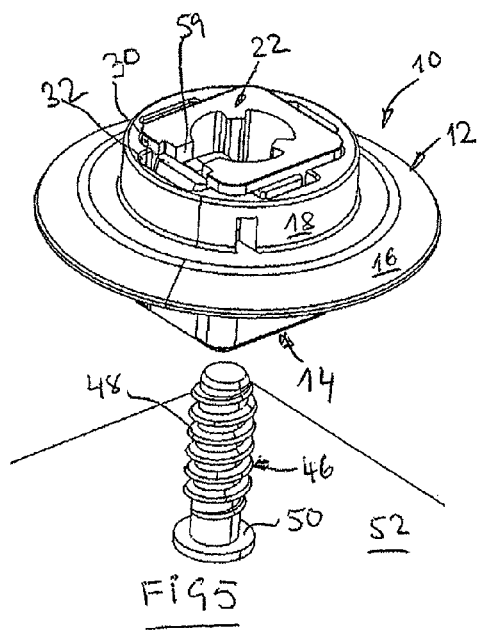
FIG. 5 shows the device of FIG. 3 in a perspective view before it is placed on a stud bolt.

Subsequently, the device 10 is pushed up on the stud bolt 46, as this is depicted in FIGS. 5 and 6. The inner locking teeth or elements 42 ratchet along the thread 48 of the stud bolt 46 until the shank portion 22 is completely pushed onto the support member 52, as this can be recognized in FIG. 6 in particular. In addition, this condition can be recognized in FIG. 8. In this, the projection of the lever 56 is deflected radially, and through this it also displaces the safety nose 30 radially towards the outside. In this way, the safety nose 30 comes out of the engagement with the abutment 36, and the upper portion 12 can be pushed downward about a desired path. This is depicted in FIG. 9. In FIG. 9, a structural member 64 to be attached is depicted, which has an opening 66, through which the shank portion 22 is inserted. Upon pushing down the upper portion 12, the flange 16 bears against the upper side of the structural member 64, and through this it clampingly retains the structural member 64 on the support member 52.

The structural member 64 can be detached again by counter clockwise turning off the entity of upper and lower portion 12, 14 from the stud bolt 46. Subsequently, by displacing the upper portion 12 from the shank portion 22 downwardly, a separation of these two portions can take place, so that they can be set in anew.

The embodiment after FIG. 11 differs from that of the preceding figures in that a fastening base 70 is formed on the lower side of the shank portion 22, which has a shank 72, from the lower end of which two locking arms 74 extend obliquely in the direction of the shank portion 22. They have locking portions 76 on the free end, by which they can grasp the edge of a hole when the base 70 is introduced into a hole of a support member.

FIG. 12 shows a similar variant. Here, a fastening base 78 is formed on the lower side of the shank portion 22, which has a frame-shaped shaft 80 with a lower transverse bridge 82. The outer side of the frame 80 is approximately partially cylindrical. Two locking arms 84, 86 are formed on the transverse web 82 with upper locking portions, comparable with the locking portions 76 after FIG. 11. The different height of the arms 84, 86 permits the utilisation of the base 78 in plates of a support member having different thicknesses. Locking arms can also be arranged on the transverse bridge 82 at the opposing side of the frame-shaped base, as the same can be recognised at 86. Depending on the circumstances, one pair of locking arms 84, 86 may be sufficient when the fastening hole is circular.

In difference to the embodiments according to FIG. 1 to 10, the embodiments of FIGS. 11 and 12 feature no safety nose 30 and no lever 56 however, in order to provide a temporary fixation between upper and lower portion.

The invention claimed is:

1. A fastening device for attaching a structural member to a support member, said device comprising:
   a lower portion having a shank portion attachable to the support member,
   an upper portion having a radial flange at an outer side and an axial passage passing through the upper portion on an inner side,
   at least one outer side of the shank portion having an axially parallel extending row of saw-tooth-shaped teeth, and
   a resilient pawl being formed at the axial passage for cooperating with the row of teeth in a ratchet manner, when the upper portion is pushed onto the shank portion in a first direction, to block a relative displacement of the upper and lower portions in a second, opposite direction, wherein
   the axial passage of the upper portion is configured to receive the shank portion from a first end of the shank portion,
   the upper portion is removable through a second end of the shank portion opposite to the first end in the first direction, and
   the shank portion has a through hole passing through the lower portion from the first end of the shank portion to the second end of the shank portion.

2. The device of claim 1, wherein the upper and lower portions are integrally formed, however, adapted to be separated, when integrally formed said pawl and the teeth are out of engagement.

3. The device of claim 1, wherein rows of teeth and pawls are provided at least at two opposing sides of the shank portion or the passage, respectively.

4. The device of claim 1, further comprising a lever which is formed by an axially parallel recess of the upper portion, wherein the pawl is formed at an end of said lever.

5. The device of claim 1, wherein the shank portion is connected to a fastening clip, the clip including a shank and locking arms at an end thereof, the locking arms extend obliquely towards the shank portion.

6. The device of claim 1, wherein the shank portion is connected to a fastening base which includes
   a frame-shaped or cylindrical shaft, and
   two or more locking arms being formed at least on one side of a lower transverse web of the frame-shaped or cylindrical shaft,
   wherein the locking arms extend obliquely towards the shank portion, and have locking portions at ends of the arms being located at different heights.

7. The device of claim 1, wherein the shank portion has a rectangular shape.

8. The device of claim 1, wherein the shank portion further comprises
   inner locking portions circumferentially equally spaced in the through hole, and
   guiding bridges protruding inwardly toward the axis of the shank portion and provided between the adjacent inner locking portions.

9. The device of claim 1, wherein the through hole of the shank portion is coaxial with the axial passage of the upper portion when the shank portion is received in the axial passage of the upper portion.

10. The device of claim 1, further comprising:
    a safety nose at an end of the passage of the upper portion,
    wherein the shank portion has (i) an outer recess which is axially engageable with the safety nose when the upper portion is pushed onto the shank portion, and (ii) a stop in the outer recess of the shank portion for limiting a movement of the upper portion and the shank portion.

11. A fastening device for attaching a structural member to a support member, said device comprising:
    a lower portion having a shank portion attachable to the support member,
    an upper portion having a radial flange at an outer side and an axial passage passing through the upper portion on an inner side,
    at least one outer side of the shank portion having an axially parallel extending row of saw-tooth-shaped teeth,
    a resilient pawl being formed at the axial passage for cooperating with the row of teeth in a ratchet manner, when the upper portion is pushed onto the shank portion in a first direction, to block a relative displacement of the upper and lower portions in a second, opposite direction,
    a safety nose at an end of the passage of the upper portion, the nose engaging axially a parallel outer recess of the shank portion when the upper portion is pushed onto the shank portion,
    a stop in the recess for limiting a movement of the safety nose, and
    an axially parallel arm on a wall of the shank portion facing the safety nose,
    wherein said arm has
      a first, free end adapted to cooperate with one side of a thread of a bolt, and
      a second end being located opposite to the safety nose to free the safety nose from the stop when the arm is radially outwardly deformed away from the thread of the bolt,
    wherein
    the axial passage of the upper portion is configured to receive the shank portion from a first end of the shank portion,
    the upper portion is removable through a second end of the shank portion opposite to the first end in the first direction, and
    the shank portion has a further axial passage.

12. The device of claim 11, wherein the shank portion further comprises
    inner locking portions circumferentially equally spaced in the further passage, and
    guiding bridges provided between the inner locking portions and adapted to prevent a misalignment of the shank portion on the bolt.

13. The device of claim 11, wherein the lower portion is solely formed by the shank portion.

14. The device of claim 11, wherein the safety nose abuts against the stop when the pawl engages a first tooth in said row of teeth.

15. A fastening device for attaching a structural member to a support member, said device comprising:
    a lower portion having a shank portion attachable to the support member, an upper portion having a radial flange at an outer side and an axial passage passing through the upper portion on an inner side, at least one outer side of the shank portion having an axially parallel extending row of saw-tooth-shaped teeth, and a resilient pawl being formed at the axial passage for cooperating with the row of teeth in a ratchet manner, when the upper portion is pushed onto the shank portion in a first direction, to block a relative displacement of the upper and lower portions in a second, opposite direction, wherein the axial passage of the upper portion is configured to receive the shank portion from a first end of the shank portion, the upper portion is removable through a second end of the shank portion opposite to the first end in the first direction, the shank portion includes a through hole passing through the lower portion from the first end of the shank portion to the second end of the shank portion, inner locking portions circumferentially equally spaced in the through hole, and guiding bridges provided between the inner locking portions.

16. The device of claim 15, wherein the lower portion is solely formed by the shank portion.

17. The device of claim 15, further comprising: a safety nose at an end of the passage of the upper portion, wherein the shank portion has (i) an outer recess which is axially engageable with the safety nose when the upper portion is pushed onto the shank portion, and (ii) a stop in the outer recess of the shank portion for limiting a movement of the upper portion and the shank portion, wherein the safety nose abuts against the stop when the pawl engages a first tooth in said row of teeth.

18. The device of claim 15, wherein the through hole of the shank portion is coaxial with the axial passage of the upper portion when the shank portion is received in the axial passage of the upper portion.

* * * * *